A. R. FRANK.
PROCESS OF PRODUCING HYDROGEN.
APPLICATION FILED MAR. 14, 1913.
1,107,926.
Patented Aug. 18, 1914.
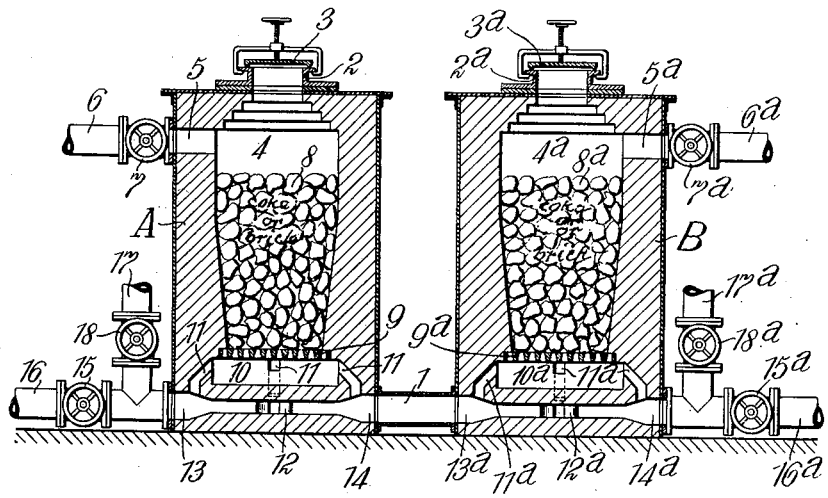
Witnesses:
Charles Mathé
H. J. Browne
Inventor
Albert Rudolph Frank
by
John Lotka
Attorney

UNITED STATES PATENT OFFICE.

ALBERT RUDOLPH FRANK, OF HALENSEE, NEAR BERLIN, GERMANY.

PROCESS OF PRODUCING HYDROGEN.

1,107,926.  Specification of Letters Patent.  Patented Aug. 18, 1914.

Application filed March 14, 1913. Serial No. 754,190.

*To all whom it may concern:*

Be it known that I, ALBERT RUDOLPH FRANK, a citizen of the Empire of Germany, residing at Halensee, near Berlin, Germany, have invented certain new and useful Improvements in Processes of Producing Hydrogen, of which the following is a full, clear, and exact description.

My invention relates to improvements in processes of producing hydrogen from natural or rock gas and other gases containing a high percentage of methane.

In the United States at numerous places natural or rock gas is found which largely consists of methane while as minor constituent parts hydrogen and hydrocarbons of the methane and ethylene series, carbonic oxid, sulfid of hydrogen, and nitrogen are contained therein. In some cases these gases contain up to 99 per cent. of methane.

My invention is based on the fact, that at very high temperatures exceeding the decomposing temperature considerably, the methane can completely be split into carbon and hydrogen, in which case from one volume of methane two volumes of hydrogen are obtained in addition to the carbon. Thereby I am enabled to produce from natural gases or other gases which are rich in methane, hydrogen for chemical and technical purposes, which may be used for example for filling air ships and the like.

In carrying out my improved process I start from rock gas or other gas which is rich in methane and free the same of hydrogen sulfid in any known manner, for example by passing the gas through a purifier which contains an iron oxid, such for example as limonite. Thereupon the gas is subjected to a temperature of at least 1200 degrees centigrade. The decomposition of the gas begins at a temperature of about 800 degrees centigrade, while the gas is completely split into carbon and hydrogen when the highest temperature exceeding 1200 degrees centigrade is attained. At this temperature the higher hydrocarbons also are decomposed into carbon and hydrogen. By the decomposition carbon is split off, so that the carbonic acid contained in the gas is reduced to carbonic oxid. Therefore the finished gas contains in addition to the hydrogen only slight amounts of carbonic oxid and nitrogen, which however are not objectionable when using the gas for technical purposes. For special purposes, the produced hydrogen can be subjected to a further purification. Small amounts of hydric sulfid, for instance, may be removed at high temperatures by lime, protoxid of iron, etc., and carbonic oxid or carbonic acid by soda-lime. Preferably the decomposition of the rock gas is carried out within a blast furnace or generator which is filled with incandescent coke, and which is from time to time reheated by passing therethrough a blast of air, in order to attain the high temperature which is necessary for decomposing the gas. This reheating takes place periodically after large quantities of gas have been passed through the coke.

If desired, the generator within which the gas is decomposed may be filled with refractory material, such as a checker work made from refractory material (fire-brick) or pieces of refractory stone. In this case the refractory filling is first heated to the required high temperature by passing therethrough rock gas together with the necessary amount of air for supporting combustion. The mixture of rock gas and air is burnt within the generator, and the combustion gases are discharged into the atmosphere. After the refractory filling has thus been heated, the rock gas to be decomposed is passed through the generator, and the hydrogen which is produced by the decomposition of the gas is led off and stored in suitable receptacles. By the decomposition of the rock gas or the like carbon is deposited on the refractory filling, which carbon is in a form similar to soot or graphite. This carbon is burnt during the following blowing period when the mixture of gas and air is being burnt for reheating the refractory filling of the generator, so that the said carbon is utilized for heating the furnace.

In order that my invention be more clearly understood, an apparatus which is suitable for putting the improved process into effect has been illustrated in the accompanying drawing, which shows in a diagrammatical way a vertical section of the apparatus.

In the example shown in the drawing the apparatus consists of two blast furnaces or generators A and B which are connected with each other at their bottoms by means of a pipe 1. The generators are constructed of refractory material and they are preferably inclosed by an iron jacket. At its top the generator A is equipped with a stud 2 through which the charge can be brought into the generator, and which is adapted to be closed by a lid or cover 3. The upper end of the chamber 4 of the generator communicates through a passage 5 with a conduit 6, and between the passage 5 and the pipe 6 a slide valve 7 is interposed. The refractory filling 8 of the chamber 4 is supported on a grate 9. This filling, as stated above, may consist of coke or of refractory stones (fire-brick). Below the grate there is a chamber 10 which communicates through several passages 11 with a transverse conduit 12 which is provided in the bottom part of the furnace and communicates with lateral passages 13 and 14 arranged opposite to each other. The passage 13 communicates with a conduit 16 which is equipped with a slide valve 15. Between the slide valve 15 and the passage 13 a conduit 17 is branched off, which is directed upward and is equipped with a slide valve 18. The passage 14 communicates with the pipe 1 which connects the generators A and B with each other.

The generator B is constructed in the same way as the generator A and it is provided with similar conduits and passages. At its top it is provided with a stud 2ª for filling the generator, the said stud being adapted to be closed by a lid 3ª. The chamber 4ª communicates through a passage 5ª with a conduit 6ª which is adapted to be closed by a valve 7ª. Below the refractory grate 9ª which carries the refractory filling 8ª a chamber 10ª is provided which communicates with a transverse conduit 12ª through passages 11ª, and the conduit 12ª is connected with passages 13ª and 14ª. The conduits 14ª are connected with conduits 16ª and 17ª which can be closed by slide valves 15ª and 18ª respectively. The filling 8ª may be of the same character as the filling 8, that is to say, it may consist of coke or refractory stones (fire-brick).

When it is desired to heat the generators A and B the valves 7 and 7ª are closed, and the lids 3 and 3ª and all the other valves are opened. Thereupon rock gas is admitted through the conduits 17 and 17ª, and air is admitted through the conduits 16 and 16ª into the lower parts of the generators and the refractory fillings 8 and 8ª thereof. By the combustion of the mixture of gas and air the fillings 8 and 8ª are heated to high temperature, while the gases of combustion escape through the studs 2 and 2ª. After a certain time when the desired temperature within the chambers 4 and 4ª has been attained, the lids 3 and 3ª are replaced on the studs 2 and 2ª, the valves 15, 18 and 15ª, 18ª are closed, and the valves 7 and 7ª are opened. Now rock gas is forced through the conduit 6 and the passage 5 and into the chamber 4 of the generator A, which rock gas at first flows through the incandescent filling 8, whence it passes through the grate 9, the chamber 10, the passages 11, the conduit 12, the passage 14 and the pipe 1 into the lower part of the generator B. In the latter the gas rises through the incandescent filling 8ª. By reason of the high temperature within the generators which is about 1200 degrees centigrade the rock gas is split into carbon and hydrogen, the carbon being deposited on the refractory fillings 8 and 8ª, and the hydrogen escaping through the passage 5ª and the conduit 6ª to a suitable gas reservoir. After the gasification has been carried on a certain time, it is interrupted, and the valves 7 and 7ª are closed and the lids 3 and 3ª are removed from their studs 2 and 2ª. Now the blowing period is started again in the manner hereinbefore described. During this period the solid carbon which has been deposited on the refractory fillings 8 and 8ª during the gasification period is burnt together with the mixture of gas and air, so that it assists in increasing the temperature of the filling. During the next gasification period I prefer to admit the rock gas through the conduit 6ª and the passage 5ª and to successively pass the same through the incandescent fillings 8ª and 8 of the generators A and B, while the hydrogen is led off through the conduit 6.

It will readily be understood, that the apparatus hereinbefore described may be changed in various ways without departing from the gist of my invention.

While in describing the invention reference has been made to a particular method of heating the rock gas or other gas, I wish it to be understood, that my invention is not limited to this particular method, and that other methods may be used for heating the gas.

I claim as my invention:

1. A process of producing hydrogen, which consists in subjecting a gas with a high percentage of methane to a temperature of at least 1200 degrees centigrade.

2. A process of producing hydrogen, which consists in purifying a gas containing a high percentage of methane, and subjecting the said gas after such purification to a temperature of at least 1200 degrees centigrade.

3. A process of producing hydrogen, which consists in subjecting rock gas to a temperature of at least 1200 degrees centigrade.

4. A process of producing hydrogen, which consists in purifying rock gas and subjecting the same to a temperature of at least 1200 degrees centigrade.

In testimony whereof I have signed this specification in the presence of two subscribing witnesses.

ALBERT RUDOLPH FRANK.

Witnesses:
 HENRY HASPER,
 WOLDEMAR HAUPT.